(12) United States Patent
Inoko

(10) Patent No.: US 12,445,708 B2
(45) Date of Patent: Oct. 14, 2025

(54) SYSTEM FOR CONTROLLING DISPLAY DEVICE ON BASIS OF IDENTIFIED CAPTURE RANGE

(71) Applicant: TEAMLAB INC., Tokyo (JP)

(72) Inventor: Toshiyuki Inoko, Tokyo (JP)

(73) Assignee: teamLab Inc., Tokyo (JP)

( * ) Notice: Subject to any disclaimer, the term of this patent is extended or adjusted under 35 U.S.C. 154(b) by 379 days.

(21) Appl. No.: 18/087,786

(22) Filed: Dec. 22, 2022

(65) Prior Publication Data

US 2023/0127443 A1 Apr. 27, 2023

Related U.S. Application Data

(63) Continuation of application No. 17/044,860, filed as application No. PCT/JP2018/038737 on Oct. 17, 2018, now abandoned.

(30) Foreign Application Priority Data

Apr. 9, 2018 (JP) .................................. 2018-074364

(51) Int. Cl.
| | |
|---|---|
| *H04N 23/61* | (2023.01) |
| *G06F 3/04842* | (2022.01) |
| *G06T 7/73* | (2017.01) |
| *H04N 23/63* | (2023.01) |

(52) U.S. Cl.
CPC ......... *H04N 23/61* (2023.01); *G06F 3/04842* (2013.01); *G06T 7/73* (2017.01); *H04N 23/632* (2023.01)

(58) Field of Classification Search
CPC ........ H04N 23/61; H04N 23/632; G06T 7/73; G06F 3/0482
USPC ............................................................ 382/103
See application file for complete search history.

(56) References Cited

U.S. PATENT DOCUMENTS

| | | | |
|---|---|---|---|
| 2013/0234930 A1* | 9/2013 | Palacios Goerger | ...................... G02B 27/017 345/156 |
| 2013/0244784 A1* | 9/2013 | Assa | ..................... G06F 3/0416 463/40 |
| 2015/0170417 A1* | 6/2015 | Palm | ................... A63F 13/5375 345/633 |
| 2018/0192149 A1* | 7/2018 | Anguiano | ........ H04N 21/25891 |

* cited by examiner

*Primary Examiner* — William D Titcomb
(74) *Attorney, Agent, or Firm* — Pyprus Pte Ltd; George D. Liu

(57) ABSTRACT

To provide a display control system in which a terminal device and a display device operate in tandem. The display control system comprises a terminal device 10 having an image-capture unit, a display device 50 for displaying video, and a control device 20 for controlling the display device 50. The terminal device 10 or the control device 20 identifies a capture range in video displayed by the display device 50 on the basis of an image captured by the image-capture unit. The control device 50 controls the display state of the video displayed by the display device 50 on the basis of the identified capture range. This configuration allows for interactive special effects such as making an object in the capture range of the terminal device 10 disappear from the video or making objects in the capture range of the terminal device 10 appear in the video.

7 Claims, 8 Drawing Sheets

(a)

(b)

SYSTEM FOR CONTROLLING DISPLAY DEVICE ON BASIS OF IDENTIFIED CAPTURE RANGE

CROSS REFERENCES TO RELATED APPLICATIONS

This application is a continuation of application Ser. No. 17/044,860, filed Oct. 1, 2020, which is the National Stage of International Application No. PCT/JP2018/038737, filed Oct. 17, 2018, which claims the benefit of Japanese Application No. 2018-074364, filed Apr. 9, 2018.

TECHNICAL FIELD

The present invention relates to a display control system and a display control method for identifying an imaging range by a terminal device in a predetermined image and controlling a display state of the image based on the imaging range. For example, in the system according to the present invention, when an animal is included in an image projected on a screen, a presentation in which taking the image of the animal by a terminal device makes the animal disappear from the image can be performed as if the animal is captured by the terminal device. Alternatively, a presentation that makes an animal, a feed, and the like appear in the imaging range of the image taken by the terminal device also can be performed. The present invention relates to a terminal device used in such a system and a computer program for the terminal device.

BACKGROUND ART

Recently, with the increase of the penetration rate of sophisticated and multifunctional mobile terminals (what is called a smart phone), many attempts to increase an ability to attract customers to exhibitions and shops by providing attractive contents to mobile terminals of users have been seen.

For example, Patent Document 1 discloses a system for supporting customer attraction for shops using what is called an Augmented Reality (AR) technique. In the system of Patent Document 1, an image of a predetermined character is projected on a screen disposed in an area in which goods in a shop are arranged, users takes the image by mobile terminals, the character included in the taken image is identified, and the identified character is registered in a picture book as captured. In this system, the image taken by the mobile terminal of the user is transmitted to a management server via Internet, the taken image is analyzed in the management server, and the character included in the image is identified. Since marking information (example: shape of a hat of the character) is embedded in the image of the character projected on the screen, the management server is configured to identify what kind of character the user took the image of by extracting the marking information from the taken image.

Patent Document 1: JP-A-2016-62273

DISCLOSURE OF THE INVENTION

Problems to be Solved by the Invention

Incidentally, the system of Patent Document 1 only determines whether the mobile terminal succeeded in capturing (taking the image of) the character or not by analyzing the taken image received from the mobile terminal in the management server, and the character continues to be projected on the screen even when capturing (taking the image of) the character is successfully performed. While a target moves to the user side and does not remain at its original position when the target is captured in the real world, since the character remains on the screen after the capture in the system of Patent Document 1, it can be said to be deviated from the situation in the real world. Thus, in the system of Patent Document 1, there is a problem in that an experience with reality like actually capturing the character on the screen cannot be provided to the user.

Since the system of Patent Document 1 is premised on determining whether the mobile terminal succeeded in taking the image of the character or not by the management server, provisionally, when the mobile terminal takes the image on the screen in which the character is not included, which range in the image the mobile terminal is taking cannot be identified. Therefore, this system cannot perform an interactive (bidirectional) presentation to, for example, cause a new character to appear in the imaging range of the mobile terminal.

Accordingly, it is a main object of the present invention to provide an interactive presentation with reality in a system of taking an image displayed on a display device by a user using a terminal device.

Solutions to the Problems

A first aspect of the present invention relates to a display control system. The display control system includes a terminal device that includes an imaging unit, a display device that displays an image, and a control device that controls the display device. The terminal device is connected to the control device via a communication line (Internet and LAN) wirelessly or by wire so as to mutually transmit and receive information. An exemplary display device is a projector that projects an image on a screen, and a display that displays an image on a liquid crystal panel, an organic EL panel, and the like. The "image" displayed by the display device includes a moving image and a still image.

When the terminal device takes the image displayed by the display device using the imaging unit, the terminal device or the control device identifies an imaging range in the image displayed by the display device based on the taken image taken by the imaging unit. For example, when the image includes a background and an object, the taken image is analyzed to extract the background, and the extracted background is compared with map information (information preliminarily stored in the terminal device or the control device) for identifying a coordinate in the image, thereby ensuring identifying the imaging range in the image. The map information may be data (learned model) generated by preliminarily accumulating a plurality of images partially clipped from the entire image and performing a machine learning, such as a deep learning, using the accumulated images as teacher data. The use of the machine learning increases an accuracy of identifying the coordinate of the imaging range even when the image is a moving image. In addition, the terminal device may identify the imaging range based on the image taken by itself and transmit information of the imaging range to the control device, or the terminal device may transmit the taken image to the control device and the control device may identify the imaging range based on the taken image.

Then, the control device controls the display device based on the identified imaging range. For example, the object included in the imaging range can be non-displayed, the object can be made appear in the imaging range, and a frame indicating the imaging range of the terminal device can be displayed in real-time. Thus, when the terminal device takes the image displayed by the display device, by controlling a display state of the image corresponding to the imaging range in real-time, an interactive presentation with reality, for example, in which the object whose image is taken (captured) by the terminal device disappears from the image, can be performed. The display presentation using the imaging range by the terminal device is not limited to those described above, and applicable to other various forms.

In the system according to the present invention, the control device may control the display device to display a predetermined object, determine whether the object is included in the identified imaging range or not, and control a display state of the object by the display device based on a result of the determination here. The object may act in real-time in a world coordinate system constituting the image based on the control by the control device.

In the system according to the present invention, the control device preferably controls the display device to cause the object to be non-displayed when the object is included in the identified imaging range. Accordingly, since the object whose image is taken by the user disappears from the image, an experience with reality as if the user actually captures the object in the image can be provided. Note that the display control of the object is not limited to this, and is applicable to various presentations in which, for example, a color of the object included in the imaging range of the terminal device is changed, the object is deformed, and an action of the object is changed.

In the system according to the present invention, the control device preferably controls the display device to make the predetermined object appear in the identified imaging range. Accordingly, since the user can make the object appear at any position in the image, an experience with a sense of immersion can be provided to the user. In addition, for example, a presentation in which the user makes the object once captured in the image appear at any other position can be performed.

In the system according to the present invention, the terminal device preferably stores the map information to identify the coordinate in the image, refers to the map information to identify coordinate information of the imaging range, and transmits the coordinate information of the imaging range to the control device. While the taken image can be analyzed by the control device side to identify the imaging range, in this case, when accesses from many terminal devices are concentrated to the control device, an excessive load is applied to the control device and a bottleneck possibly occurs to cause a delay in process. Therefore, the analysis process of the taken image is preferably performed by the terminal device side and only the coordinate information of the imaging range is transmitted to the control device, thereby avoiding the occurrence of the bottleneck.

In the system according to the present invention, the terminal device may further include a location information identification unit to identify a current location of itself. An exemplary location information identification unit is an ultrasonic wave sensor that analyzes a frequency of an ultrasonic sound wave output from an ultrasonic generator installed in an event venue. By dividing the event venue into a plurality of areas and disposing the ultrasonic generators having different output frequencies in the respective areas, the terminal device can identify the current location of itself through the analysis of the frequency of the ultrasonic sound wave by the terminal device. Other examples of the location information identification include a GPS receiver and the like. In this case, the terminal device or the control device may identify the imaging range in the image displayed by the display device based on the taken image taken by the imaging unit and the information of the current location identified by the location information identification unit. Thus, by identifying the imaging range in the image based on the location information of the terminal device in addition to the taken image, the accuracy of the identification process can be improved. For example, when the image is displayed over a wide range in the venue, it is possible that the backgrounds in the image are same at a plurality of positions. In this case, the imaging range of the terminal device possibly fails to be identified only by the background in the image. Therefore, referring to the location information of a mobile terminal facilitates uniquely identifying the imaging range by the terminal device.

A second aspect of the present invention relates to a terminal device. The terminal device according to the present invention includes an imaging unit, an image analysis unit, and a communication unit. The imaging unit is a camera to acquire an image. The image analysis unit identifies an imaging range by the imaging unit in the image based on a taken image taken by the imaging unit. The communication unit transmits information on the identified imaging range to a control device that controls a display state of the image. The terminal device may include a storage unit that stores map information for identifying a coordinate in a predetermined image. In this case, the image analysis unit of the terminal device identifies the imaging range by the imaging unit in the image based on the taken image taken by the imaging unit and the map information.

A third aspect of the present invention relates to a computer program that causes a portable information communication terminal to function as the terminal device of the display control system according to the first aspect or the terminal device according to the second aspect. The computer program may be stored in an information storage medium, or may be downloadable via Internet.

A fourth aspect of the present invention relates to a control device that controls a display device based on a taken image taken by a terminal device that includes an imaging unit. The control device receives the taken image from the terminal device and identifies an imaging range in an image displayed by the display device based on the taken image. Alternatively, the terminal device identifies the imaging range in the image displayed by the display device based on the taken image, and the control device receives information on the imaging range from the terminal device. Then, the control device controls the display device based on the identified imaging range.

A fifth aspect of the present invention relates to a display control method. The display control method according to the present invention includes a first step of identifying an imaging range in an image by a terminal device or a control device based on a taken image, the image being displayed by a display device, and the taken image being taken by a imaging unit of the terminal device, and a second step of controlling the image displayed by the display device by the control device based on the identified imaging range.

Effects of the Invention

According to the present invention, the interactive presentation with reality can be performed in the system of taking the image displayed by the display device by the user using the terminal device.

DESCRIPTION OF PREFERRED EMBODIMENTS

The following describes embodiments of the present invention using the drawings. The present invention is not limited to the embodiments described below and includes ones appropriately changed from the following embodiments in an obvious range by those skilled in the art.

Figure 1:
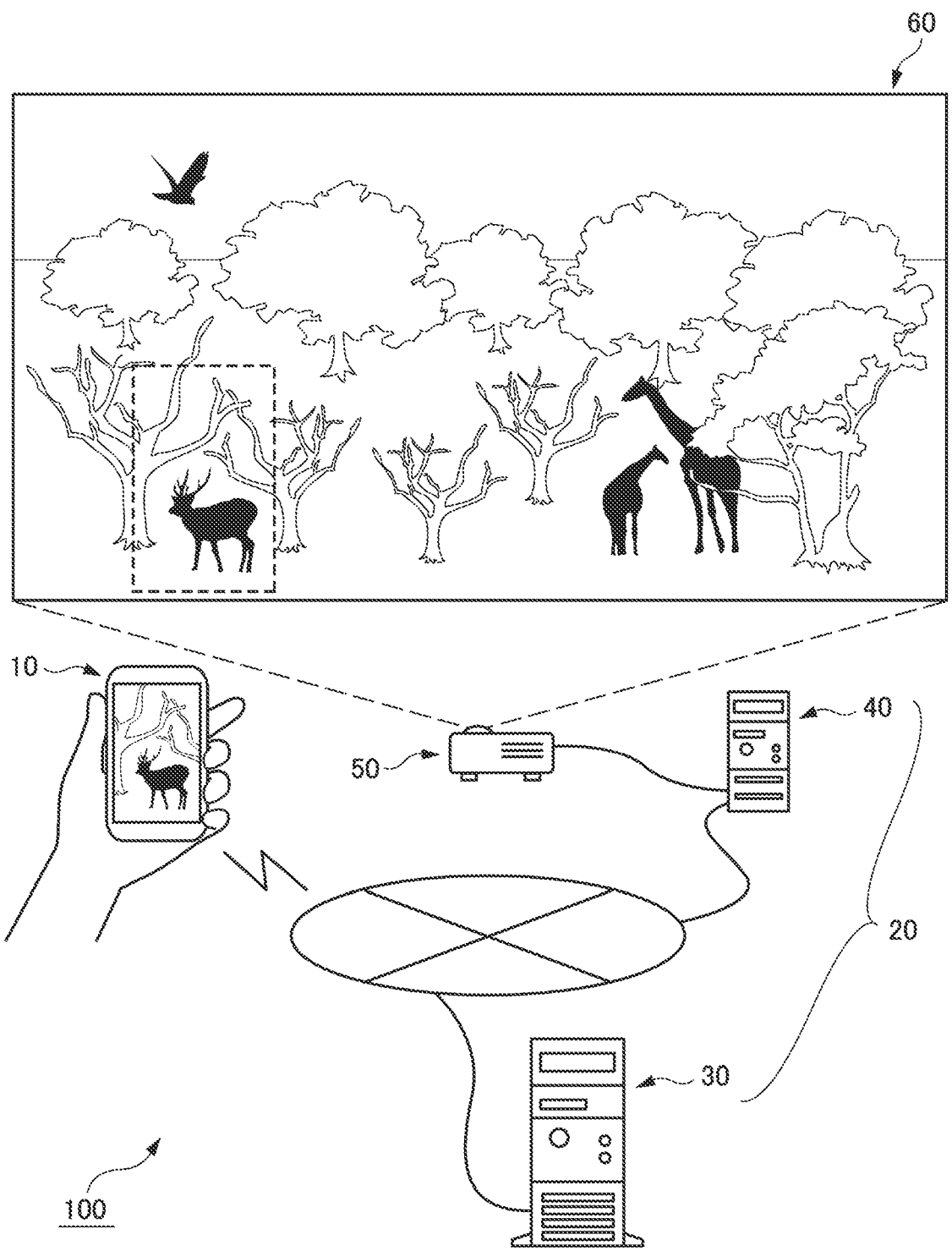
FIG. 1 schematically illustrates an overall configuration of a display control system.

FIG. 1 schematically illustrates an overall configuration of a display control system 100 according to one embodiment of the present invention. As illustrated in FIG. 1, the display control system 100 according to the present invention includes a terminal device 10, a control device 20, and a display device 50. The terminal device 10 is connected to the control device 20 via a communication line, such as Internet and a LAN. The terminal device 10 is a portable information communication terminal carried by a user of the system, and for example, a smart phone and a tablet terminal are usable. The terminal device 10 includes a camera (imaging unit), and is configured to take an image displayed by the display device 50 to acquire an image. The control device 20 controls the display device 50 to output a predetermined image. In this embodiment, the control device 20 is configured to include a management device 30 and a drawing device 41 mutually connected via the communication line. An exemplary management device 30 is a web server communicative with the terminal device 10, and an exemplary drawing device 41 is a local PC disposed in the same facility as the display device 50 and connected to the display device 50 by wire or wireless. The display device 50 outputs a predetermined image in accordance with the control by the control device 20. In this embodiment, as the display device 50, a projector configured to project an image on a screen 60 is employed. Note that the projector can be substituted by a display device, such as a liquid crystal display and an organic EL display. A plurality of display devices 50 may be installed in an event venue. In this case, a drawing device 40 and the display device 50 can be corresponded by one-to-one, or a plurality of display devices 50 can be connected to one drawing device 40.

Figure 2:
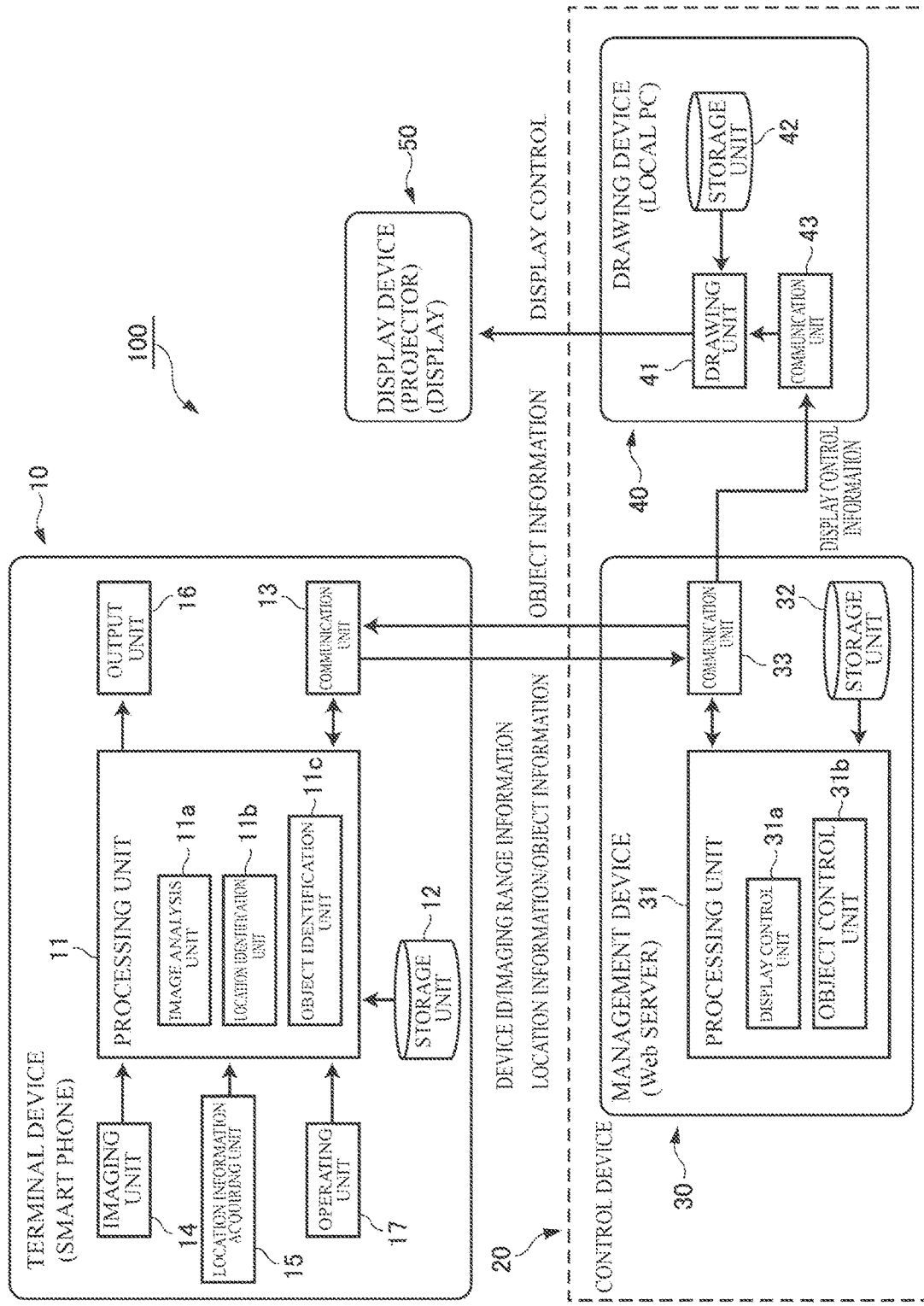
FIG. 2 illustrates a function block of various devices constituting the display control system.

FIG. 2 illustrates a function block of the display control system 100. As illustrated in FIG. 2, the terminal device 20 includes a processing unit 11, a storage unit 12, a communication unit 13, an imaging unit 14, a location information acquiring unit 15, an output unit 16, and an operating unit 17. Note that FIG. 2 illustrates common function compositions of the terminal device 10. In this system, while a plurality of the terminal devices 10 are assumed, all the terminal devices 10 need not to have the same configuration and may have different configurations.

The processing unit 11 of the terminal device 10 performs processes to control the other components 12 to 17 included in the terminal device 10. As the processing unit 11, a processor, such as a CPU or a GPU, can be used. The processing unit 11 reads an application program (computer program) stored in the storage unit 12, and controls the other components in accordance with the application program. The processing unit 11 can write calculation results according to the application program in the storage unit 12 and read them as necessary.

In this embodiment, the processing unit 11 of the terminal device 10 includes an image analysis unit 11a, a location identification unit 11b, and an object identification unit 11c. The image analysis unit 11a analyzes a taken image acquired by the imaging unit 14 and identifies an imaging range in the image displayed by the display device. At this time, the image analysis unit 11a can refer to map information stored in the storage unit 12. The map information includes information on coordinate positions of respective points in the entire image. The location identification unit 11b identifies a current location of its own terminal device 10 based on the information acquired by the location information acquiring unit 15. The object identification unit 11c identifies an object included in the taken image based on the information acquired from the control device 20, or performs a process to select the object based on an instruction of the user input via the operating unit 17. Details of the processes performed by the functional units 11a to 11c will be described later with reference to flowcharts illustrated in FIG. 4 and FIG. 8.

The storage unit 12 of the terminal device 10 is a component to store information used for arithmetic operations and the like in the processing unit 11. Specifically, the storage unit 12 stores an application program to cause a general-purpose portable information communication terminal to function as the terminal device 10 in the display control system 100 according to the present invention. This application program may be downloaded to the terminal device 10 via Internet, or may be preinstalled in the terminal device 10. In addition, the storage unit 12 may store other programs in addition to the application program for the system. When the application program for the system is started by the instruction of the user, the process according to the program is executed. The storage unit 12 may store a terminal ID unique to the terminal device 10 and a user ID unique to the user carrying it. The storage unit 12 stores an IP address as identification information on a network. Furthermore, the storage unit 12 preliminarily stores map information that the image analysis unit 11a of the processing unit 11 refers to for identifying the imaging range in the image from the taken image. The storage unit 12 stores information (image data, explanations of the objects, and the like) on the objects that can be captured or released by the terminal device 10 in association with ID information of the respective objects. The storage function of the storage unit 12 can be achieved by a non-volatile memory, such as an HDD and an SDD. In addition, the storage unit 12 may have a function as a memory to write or read, for example, a progress of the arithmetic operation by the processing unit 11. The memory function of the storage unit 12 can be achieved by a volatile memory, such as a RAM and a DRAM.

The communication unit 13 of the terminal device 10 is a component to perform transmission and reception of the information with the control device 20 (specifically, the management device 30) via the communication line, such as Internet. The communication unit 13 can transmit various kinds of information to the control device 20 and receive them from the control device 20 in accordance with the control by the processing unit 11.

The imaging unit 14 is a camera to acquire image data of a still image or a moving image. As the camera constituting the imaging unit 14, the one built-in the terminal device 10 is used. The image data acquired by the imaging unit 14 is saved in the storage unit 12 after sending to the processing unit 11 and performing a predetermined arithmetic operation. The camera includes, for example, a lens, a mechanical shutter, a shutter driver, a photoelectric conversion element, such as a CCD image sensor unit and a CMOS image sensor unit, a digital signal processor (DSP) that reads an electric charge amount from the photoelectric conversion element to generate image data, and an IC memory.

The location information acquiring unit 15 is a component to acquire information on current location information of the terminal device 10. The location information acquiring unit 15 of the terminal device 10 is, for example, an ultrasonic wave sensor configured to receive an ultrasonic sound wave of a predetermined frequency transmitted from an ultrasonic generator installed in the event venue. For example, the event venue is divided into a plurality of areas, and the ultrasonic generators that generates different frequencies are disposed in the respective areas. In this case, the ultrasonic sound waves of the respective frequencies function as the location information. In addition, the location information acquiring unit 15 may be a GPS positioning unit that has a function to perform a positioning using a Global Positioning System (GPS). Specifically, the GPS positioning unit measures time periods taken for receiving respective radio waves based on information on a radio wave transmission time included in the radio waves transmitted from a plurality of GPS satellites, and calculates information on a latitude and a longitude of a located position of the terminal device 10 based on time period information indicating the time period.

The output unit 16 is a component to output various kinds of information to the user of the terminal device 10. The information arithmetically operated by the processing unit 11 is output by the output unit 16. As the output unit 16, various kinds of external output devices used in known information communication terminals are employable. The example of the output unit 16 includes a display, a speaker, a flashlight, and a vibrator, but is not limited to them. The output unit 16 can output various kinds of information in accordance with the control by the terminal control unit 11.

The operating unit 17 is a component to accept an input of the information to the terminal device 10 from the user. The information input via the operating unit 17 is transmitted to the processing unit 11. As the operating unit 17, various kinds of input devices used in known information communication terminals are employable. The example of the operation 17 includes a touch panel, a button, a cursor, a microphone, a keyboard, and a computer mouse, but is not limited to them. The touch panel constituting the operating unit 17 may constitute a touch panel display together with the display constituting the output unit 16.

The control device 20 is a computer to control the display device 50. The control device 20 is configured to reflect the information (specifically, the information on the imaging range of the image by the imaging unit) acquired from the terminal device 10 on the control of the display device 50. As described above, in this embodiment, the functions of the control device 20 are dispersed to the management device 30 as the web server and the drawing device 40 as the local PC. However, when the display device 50 is directly communicative with the management device 30 as the web server via Internet, the functions of the control device 20 can be integrated in the management device 30, and when the terminal device 11 is directly communicative with the drawing device 40 as the local PC via the LAN, the functions of the control device 20 can be integrated in the drawing device 40. The management device 30 and the drawing device 40 may be each established by a plurality of computers.

The management device 30 is connected to the terminal device 10 and the drawing device 40 via Internet. The management device 30 basically has a function of generating an image in real-time and transmitting control information for displaying the image to the drawing device 40 to cause the drawing device 40 to control the display device 50. As illustrated in FIG. 2, the management device 30 is configured to include at least a processing unit 31, a storage unit 32, and a communication unit 33.

As the processing unit 31 of the management device 30, a processor, such as a CPU or a GPU, is usable. The processing unit 31 reads image contents stored in the storage unit 32 and generates the image output from the display device 50 in real-time. In this embodiment, the processing unit 31 of the management device 30 includes a display control unit 31a and an object control unit 31b. The display control unit 31a controls a display state of the image, mainly a background image, to be displayed by the display device 50. The object control unit 31b controls the display state and an action of the object present in the image according to the above-described action program and the like.

The storage unit 32 of the management device 30 is a component to store the information used for the arithmetic operation in the processing unit 31 and the like. The storage unit 32 stores the image contents constituting the image displayed by the display device 50. The image contents include, for example, a background image (including a still image and a moving image) of an image, an object image displayed to be superimposed on the background image, a program to cause the object to act, and the like. The object includes the one (action object: Action Object) that moves in a world coordinate system constituting the image according to a predetermined action program or takes a predetermined action, and the one (interaction object: Interaction Object) that acts to another action object without acting by itself. In addition, the action program also can be set to cause the action objects to mutually act. The storage unit 32 can be achieved by a non-volatile memory, such as an HDD and an SDD, or a volatile memory, such as a RAM and a DRAM.

The communication unit 33 of the management device 30 is a component to perform transmission and reception of the information with the terminal device 10 and the drawing device 40 via the communication line, such as Internet. The communication unit 33 can transmit and receive various kinds of information to the terminal device 10 and the drawing device 40 in accordance with the control by the processing unit 31.

The drawing device 40 is connected to the management device 30 via Internet, and connected to the display device 50 by wire or a wireless LAN. The drawing device 40 basically causes the display device 30 to display the image according to display control information of the image received from the management device 30. As illustrated in FIG. 2, the drawing device 40 is configured to include at least a drawing unit 41, a storage unit 42, and a communication unit 43. As the drawing device 41, a processor, such as a CPU or a GPU may be used. The storage unit 42 can be achieved by a non-volatile memory, such as an HDD and an SDD, or a volatile memory, such as a RAM and a DRAM. The communication unit 43 is a component to perform transmission and reception of the information with the management device 30 via the communication line, such as Internet.

The display device 50 displays a predetermined image in accordance with the control from the drawing device 40. As the display device 50, a projector that projects an image on a screen or a wall may be employed, or a liquid crystal display and an organic EL display configured to display an image may be employed. The display device 50 may display a three-dimensional hologram image. In addition, as the display device 50, known display devices are appropriately employable.

Subsequently, with reference to FIG. 3 and FIG. 4, exemplary processes performed by the terminal device 10 and the control device 20 (management device 30 and drawing device 40) will be described. Here, a process in a case where the user captures an object in an image using the terminal device 10 will be described.

Figure 3:
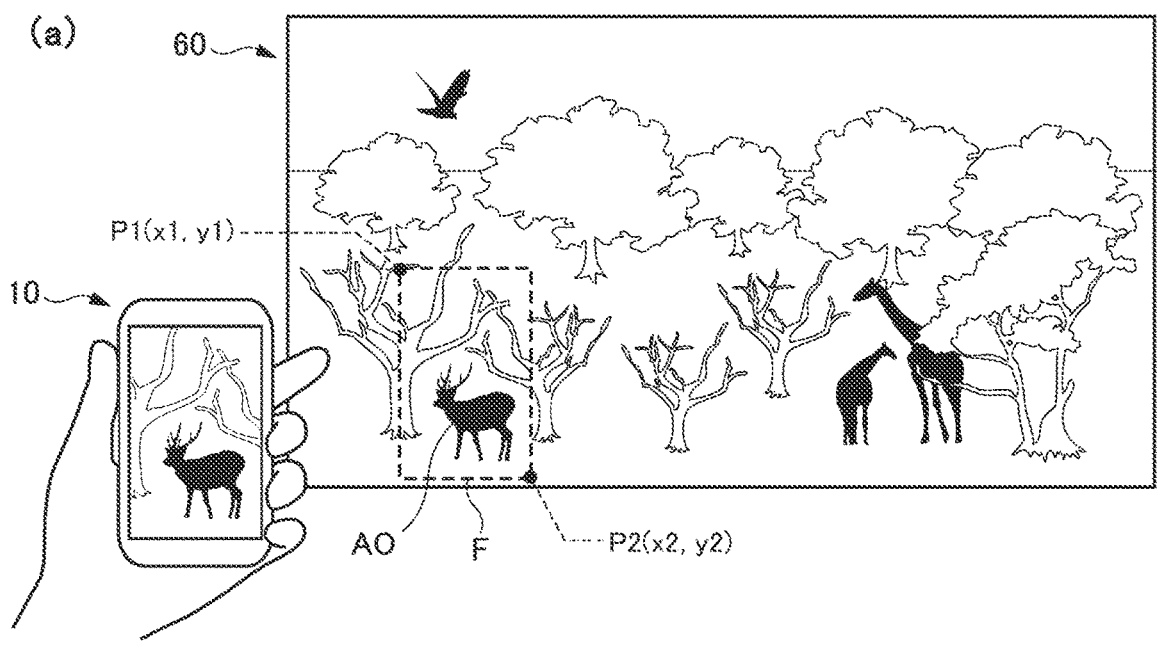
FIG. 3 schematically illustrates an exemplary operation of a presentation of capturing an action object.
Figure 3:
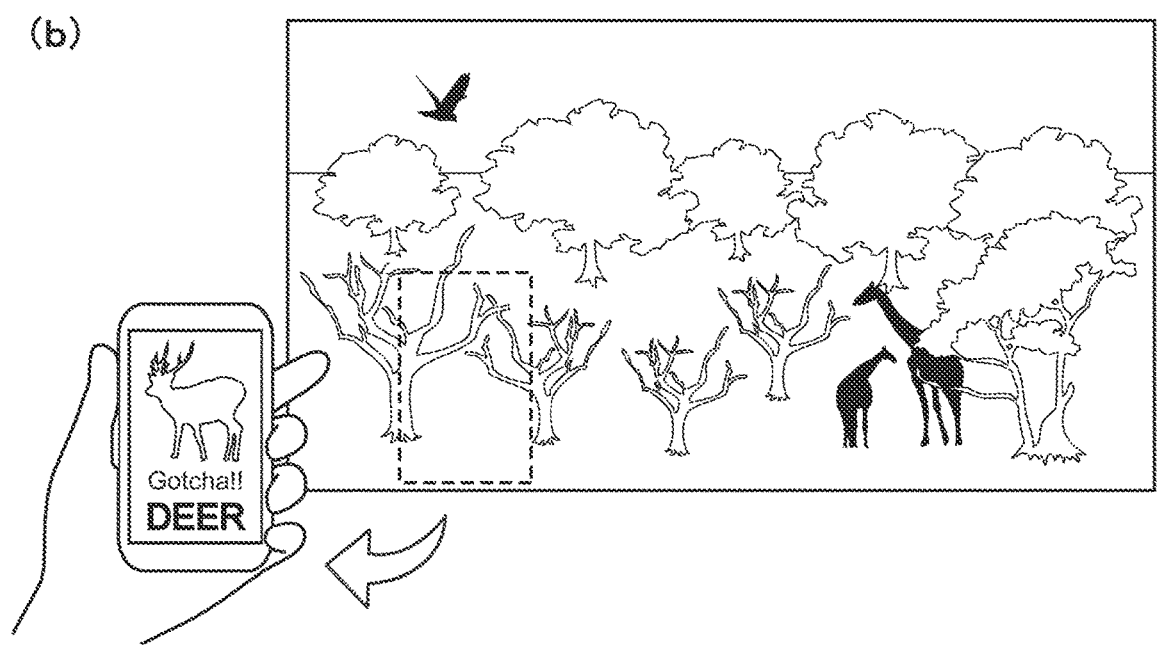

FIG. 3 illustrates an outline of a capture process of an action object. As illustrated in FIG. 3(a), when the use activates the camera of the terminal device 10 and aims the camera at the screen 60 on which the image is projected, the imaging range of the camera is displayed as a frame F on the screen 60. Note that, while the frame F is preferably displayed for indicating the imaging range to the user to be easily understood, displaying the frame F is not necessarily required. In the image projected on the screen 60, an action object AO taking a shape of a character, such as an animal, is displayed. The action object AO takes a predetermined action in an image space in accordance with a predetermined action program. When the user inputs an operation of a capture action to the terminal device 10 in a state where the action object is included in the imaging range of the terminal device 10, the terminal device 10 acquires the taken image from the camera. Then, the action object AO whose image was taken by the user disappears from the image on the screen 60. Accordingly, an experience like capturing the action object in the image can be provided to the user. The following describes such an object capture process with reference to FIG. 4.

Figure 5:
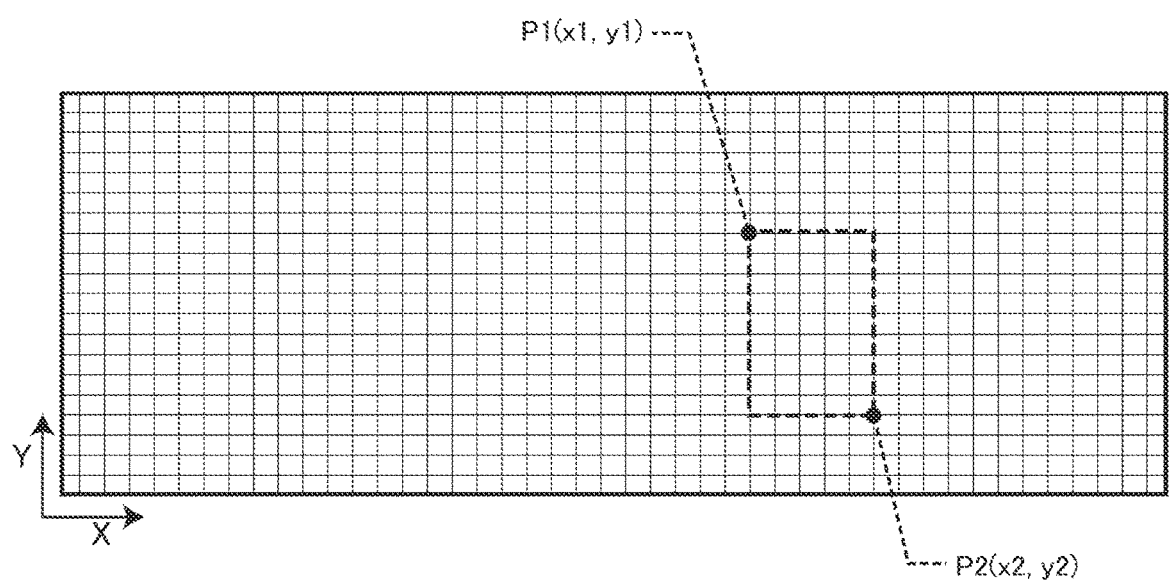
FIG. 5 conceptually illustrates exemplary map information.

First, the user activates the camera (imaging unit 14) of the terminal device 10 (Step S1-1). When the user aims the camera of the terminal device 10 at the screen 60 to take the image, the image analysis unit 11a of the terminal device 10 continuously analyzes the image taken by the camera in real-time, and identifies the imaging range in the image (Step S1-2). The imaging range is identified as follows. That is, the storage unit 12 of the terminal device 10 stores the map information indicating the coordinates of the respective points in the entire image. FIG. 5 conceptually illustrates a data structure of the map information. In the map information, respective coordinate points in the image are plotted with the background image (not illustrated) of the entire image. Therefore, in this embodiment, the coordinate points in the image are each treated as known information for the terminal device 10. In the taken image acquired from the camera, the background image is assumed to at least partially appear (while a case where only the object appears in the taken image and the background image is not included is also assumed, in this case, the frame may be non-displayed or it may be treated as a failure in capture). The image analysis unit 11a compares the background image appeared in the taken image with the background image in the map information to identify the imaging range by the camera. At this time, it is only necessary to identify coordinate information (P1, P2) of at least two corner portions on a diagonal line of a rectangular imaging range. The coordinate information of the two corner portions serves as the information to identify the imaging range.

Note that the background image constituting the image may be not only the still image but also the moving image. When the background image is the moving image, it is difficult to identify the imaging range compared with the case of the still image. In this case, a large number of partial captured images of the background image formed by the moving image are made, and the coordinate information is given to each of the captured images to accumulate a large number of pieces of teacher data. Then, a machine learning is performed based on the teacher data, and its learning result (learned model) is used as the map information. Accordingly, an accuracy in identifying the imaging range is improved even when the background image is the moving image.

Next, the location identification unit 11b of the terminal device 10 identifies an imaging location based on the location information acquired by the location information acquiring unit 15 (Step S1-3). When the location information acquiring unit 15 includes the ultrasonic wave sensor, the location identification unit 11b only needs to identify the imaging location based on the frequency of the ultrasonic sound wave generated by the ultrasonic generator installed in the venue. The location information acquiring unit 15 may be a GPS receiver.

Next, the communication unit 13 of the terminal device 10 transmits the information on the imaging range and the location information of the imaging location to the management device 30 together with the terminal ID of the terminal device 10 (Step S1-4). The display control unit 31a of the management device 30 identifies the display device 50 displaying the image at which the camera of the terminal device 10 is aimed based on the imaging range information and the location information received here. Then, the display control unit 31a of the management device 30 generates a display control command to display an image of a frame corresponding to the imaging range of the terminal device 10 in the image of the identified display device 50, and transmits it to the drawing device 40 (Step S1-5). The drawing device 40 controls the display device 50 in accordance with the command received from the management device 30. Accordingly, as illustrated in FIG. 3(a), the frame F corresponding to the imaging range of the terminal device 10 is projected on the screen 60 by the display device 50. The user adjusts a direction, an angle, and a magnification of the camera such that the action object AO appears in the imaging range of the camera while watching the display of the terminal device 10 on his/her hand or looking at the frame F displayed on the screen 60.

Next, the processing unit 11 of the terminal device 10 determines whether the user input an operation of the capture action to the terminal device 10 via the operating unit 17 or not (Step S1-6). An exemplary capture action is an operation of touching a specific portion on the display screen and an audio input operation. Insofar as the capture action is not input, Step S1-2 to Step S1-5 are repeated.

When the capture action is input, a shutter of the camera is released and a taken image (still image) is acquired. In this case, the communication unit 13 of the terminal device 10 transmits the information on the imaging range and the location information of the imaging location to the management device 30 together with the terminal ID of the terminal device 10 similarly to Step S1-4 (Step S1-7). At this time, the user ID unique to the user operating the terminal device 10 may be transmitted to the management device 30.

Next, the object control unit 31*b* of the management device 30 determines the object included in the imaging range of the terminal device 10 based on the imaging range information and the location information received from the terminal device 10 (Step S1-8). The object control unit 31*b* is a component that controls various objects present in the image space based on the action program stored in the storage unit 32. Therefore, the object control unit 31*b* obtains all the locations of the various objects present in the image space. The object control unit 31*b* refers to the coordinate information indicating the imaging range and the coordinate information of the various objects to determine whether a capturable object is present in the imaging range or not. The capturable object may be an action object that acts in accordance with the action program, or may be an interaction object that acts to the other action object. An exemplary action object is an object taking a shape of a character, such as an animal. An exemplary interaction object is an object taking a shape of an animal feed and the like. In the example of FIG. 3, an action object of a deer is included in the imaging range of the terminal device 10. Therefore, the object control unit 31*b* determines that the action object of the deer was captured by the terminal device 10. Note that when the object is not included in the imaging range of the terminal device 10, capturing the object is determined to be failed and the process is terminated.

Next, the processing unit 31 of the management device 30 transmits the information on the object determined to be captured in Step S1-8 described above to the terminal device 10 (Step S1-9). The information on the object includes the ID information unique to the object. The storage unit 12 of the terminal device 10 stores information of image data, explanations, and the like of the objects in association with the ID information of the respective objects. Therefore, by transmitting the ID information of the object as a capture target from the management device 30 to the terminal device 10, the terminal device 10 can read the information (image data and explanations) on the captured object from the storage unit 12 based on the ID information. Note that for the object not stored in the storage unit 12 of the terminal device 10, the information on the image data and the explanation of the object may be delivered from the management device 30 to the terminal device 10 in addition to the ID information of the object. Thus, the object identification unit 11*c* of the terminal device 10 identifies the object whose image was taken (captured) by its own camera based on the ID information and the like of the object received from the management device 30 (Step S1-10).

Next, the processing unit 11 of the terminal device 10 displays the information on the object identified in Step S1-10 on the output unit 16 (display) (Step S1-11). For example, the image of the object that the user succeeded in capturing and the explanation of the object may be displayed. In the example of FIG. 3(*b*), since the user captured the action object of the deer, the image of the deer, textual information on the deer ecology, and the like are displayed on the display of the terminal device 10. The processing unit 11 of the terminal device 10 stores the information on the object identified in Step S1-10 in the storage unit 12 (Step S1-12). Thus, the object captured by the user can be stored in the terminal device 10. For example, a list of the objects captured by the user may be displayed on the terminal device 10 in a picture book format.

Meanwhile, the object control unit 31*b* of the management device 30 generates a control command to cause the object to be non-displayed included in the imaging range of the terminal device 10 and transmits it to the drawing device 40. Accordingly, the drawing device 40 controls the display device 50 to hide the object whose image was taken by the terminal device 10 in accordance with the control command (Step S1-13). For example, as illustrated in FIG. 3(*b*), when the user succeeds in capturing (taking the image of) the action object AO of the deer, the action object AO of the deer disappears from the image projected on the screen 60 in coordination with it. Thus, by coordinating the image on the screen 60 with the action of the user, an experience with more reality can provided to the user.

Next, the processing unit 31 of the management device 30 stores the information on the capture action of the user in the storage unit 32 (Step S1-14). For example, the ID information of the object succeeded in the capture, a capture time, a capture location (coordinate) are registered in the storage unit 32 in association with the terminal ID unique to the terminal device 10 and the user ID unique to the user. Accordingly, an action history and the like of the user can be managed by the management device 30.

Figure 7:
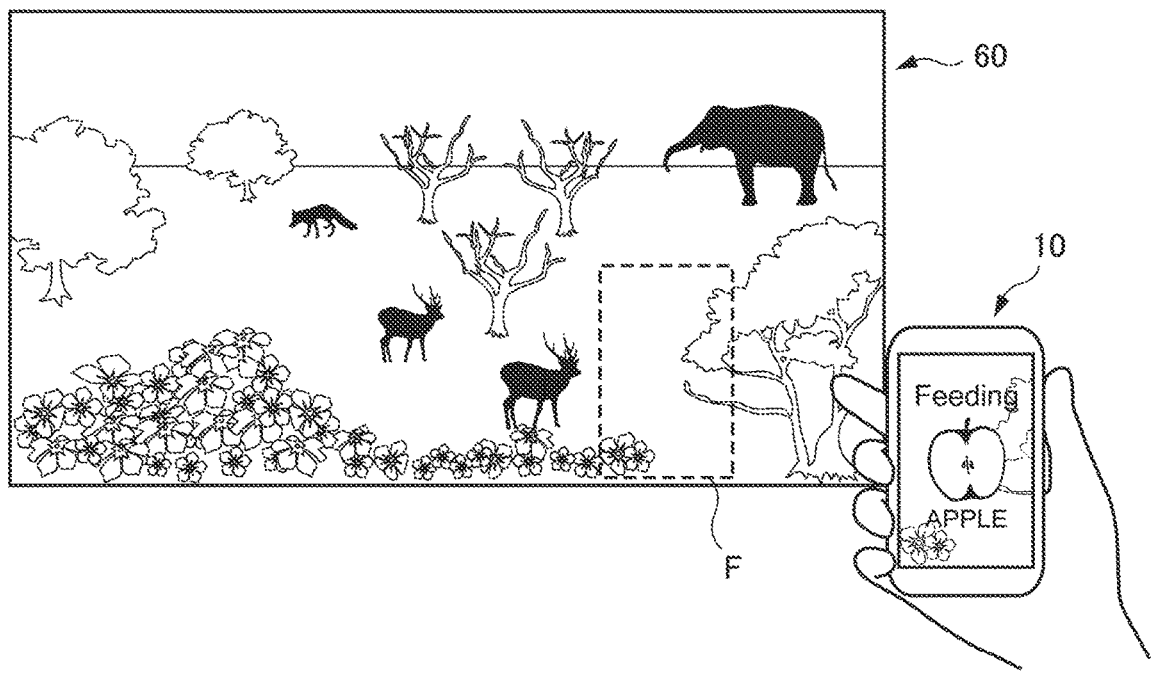
FIG. 7 schematically illustrates an exemplary operation of a presentation of releasing an interaction object.
Figure 7:
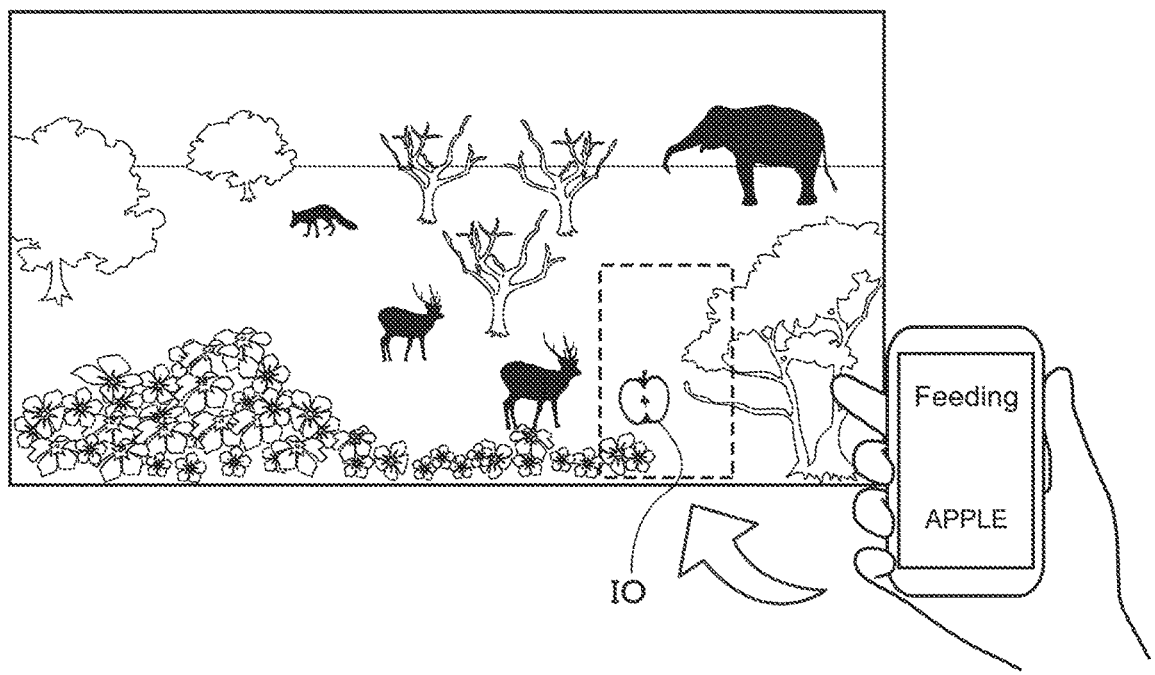
Figure 8:
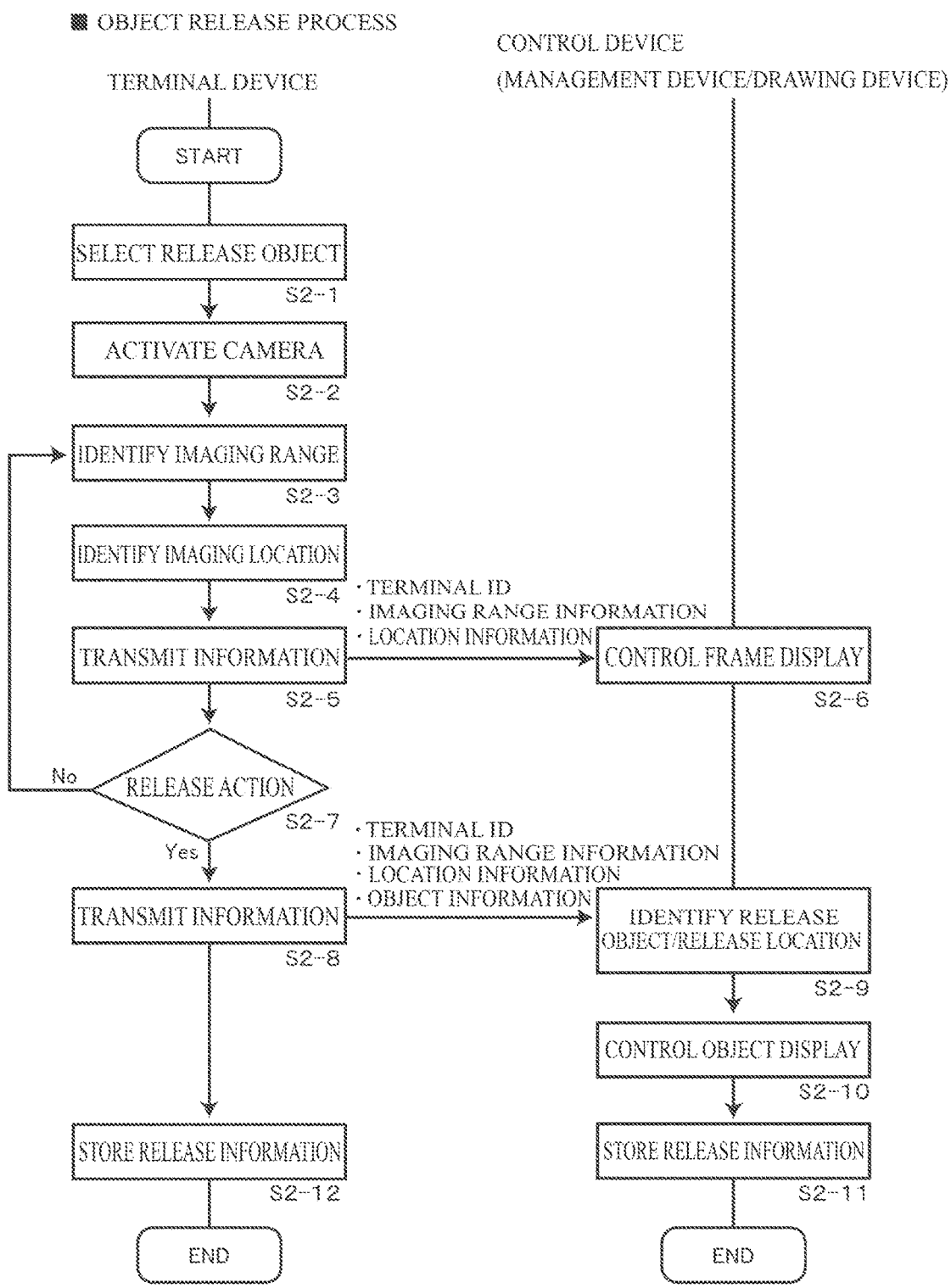
FIG. 8 is a flowchart illustrating an exemplary object capture process.

Subsequently, with reference to FIG. 6 to FIG. 8, another example of the process performed by the terminal device 10 and the control device 20 (management device 30 and drawing device 40) will be described. Here, a process when the user uses the terminal device 10 to release the object in the image will be described.

Figure 6:
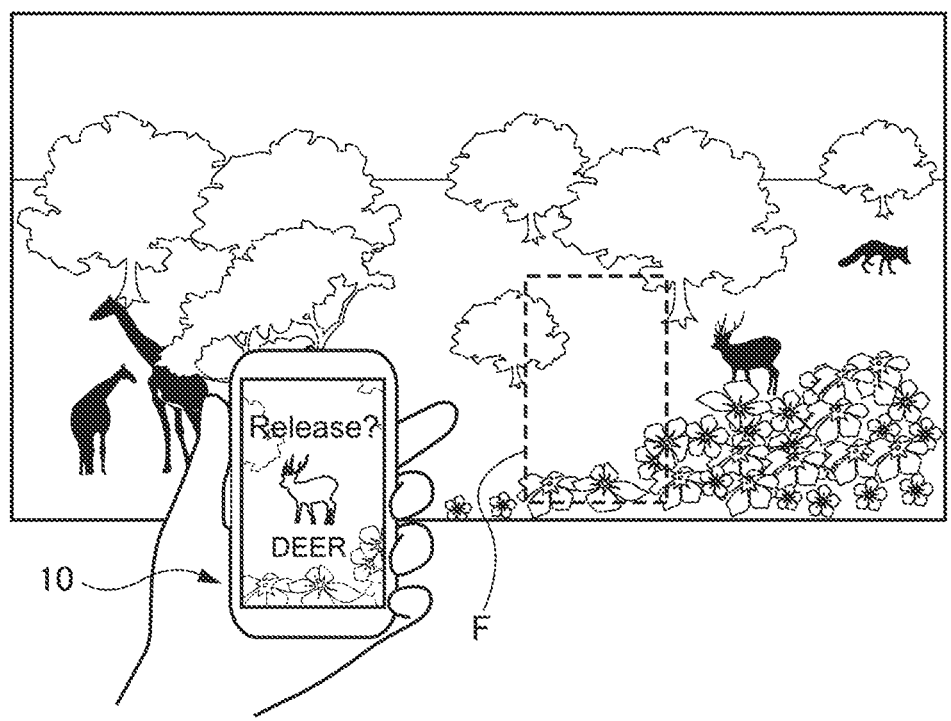
FIG. 6 schematically illustrates an exemplary operation of a presentation of releasing an action object.
Figure 6:
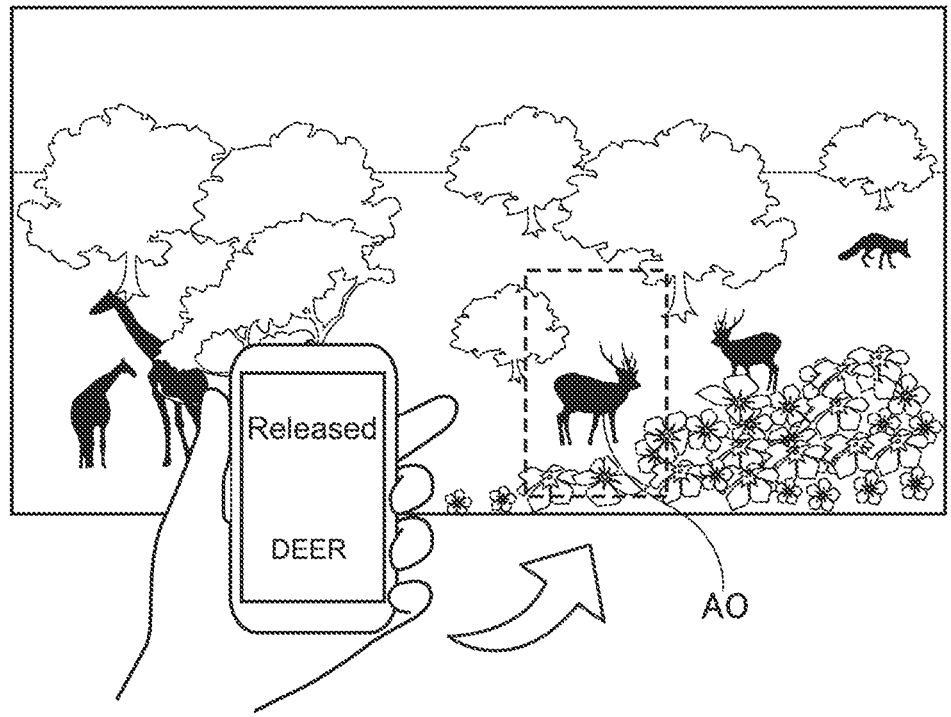

FIG. 6 illustrates an example in which the user releases again an action object once succeeded in the capture. That is, while the user captures the action object of the deer in FIG. 3, the object of the deer is released at another position in the image in FIG. 6. Thus, in this system, the object succeeded in the capture can be freely moved to the other position. Meanwhile, FIG. 7 illustrates an example in which the user releases an interaction object of a feed. The interaction object of the feed may be an item provided to the user from a system operator, or may be an item captured in the image by the user in accordance with the process illustrated in FIG. 4. The program is configured such that when the interaction object of the feed is released in the image, the action object present in its proximity is attracted to it. Thus, the user can experience the capture and the release of the action object, the feeding to the action object, or the like using this system.

In the object release process, first, the user operates the terminal device 10 to freely select the object (action object or interaction object) as a target of the release (Step S2-1). Since the storage unit 12 of the terminal device 10 stores the objects once captured by the user and the objects provided from the operator, the user selects any object among them.

Figure 4:
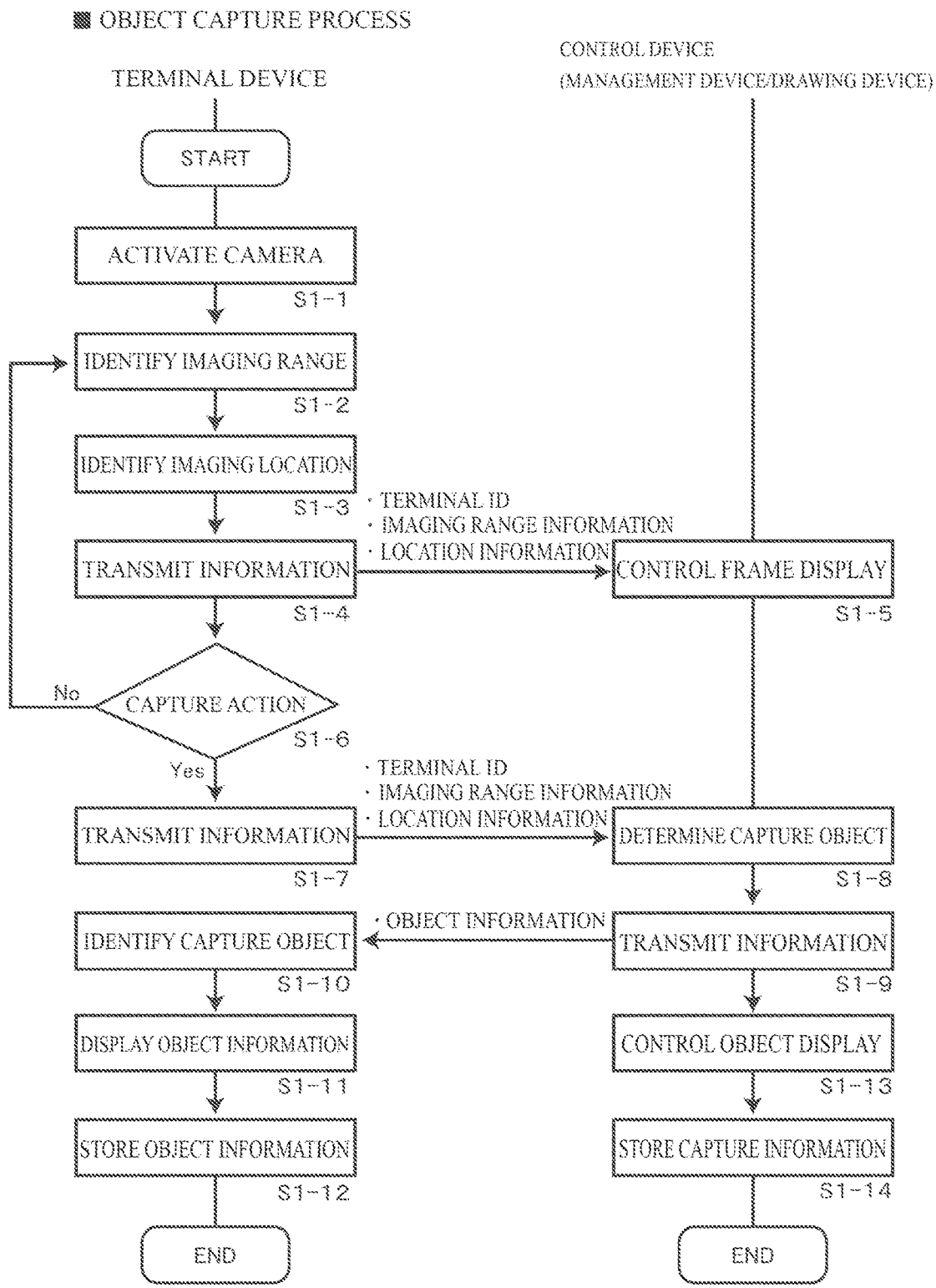
FIG. 4 is a flowchart illustrating an exemplary object capture process.

Step S2-2 to Step S2-6 are the same processes as Step S1-2 to Step S1-5 illustrated in FIG. 4, respectively. That is, the frame F corresponding to the imaging range of the terminal device 10 is displayed on the screen 60 for easy understanding of the imaging range in the image by the user.

Next, the processing unit 11 of the terminal device 10 determines whether the user input an operation of the release action to the terminal device 10 via the operating unit 17 after the object as the release target was selected or not (Step S2-7). An exemplary release action is, similarly to the capture action, an operation of touching a specific portion on the display screen and an audio input operation. Insofar as the release action is not input, Step S2-3 to Step S2-6 are repeated. When the release action is input, a shutter of the camera is released and a taken image (still image) is acquired. In this case, the communication unit 13 of the terminal device 10 transmits the information on the imaging range, the location information of the imaging location, and the information (ID information and the like of the object) on the object selected as the release target to the management device 30 together with the terminal ID (Step S2-8). At this time, the user ID unique to the user operating the terminal device 10 may be transmitted to the management device 30.

Next, the object control unit 31a of the management device 30 identifies the object as the release target and a location (coordinate) in the image at which the object is made appear based on the information received from the terminal device 10 (Step S2-9). That is, the object control unit 31 identifies the object to be made appear in the image based on the ID information of the object received from the terminal device 10, and identifies the location in the image at which the object is made appear based on the information on the imaging range. In addition, the object control unit 31a of the management device 30 generates a control command to make the object selected by the terminal device 10 appear in the imaging range of the terminal device 10, and transmits it to the drawing device 40. The drawing device 40 controls the display device 50 to display the selected object in the imaging range of the terminal device 10 in accordance with the control command (Step S2-10). Accordingly, for example, as illustrated in FIG. 6(b) and FIG. 7(b), the action object AO and the interaction object 10 selected by the user appear in the imaging range of the terminal device 10 in the image projected on the screen 60.

Next, the processing unit 31 of the management device 30 stores the information on the release action of the user in the storage unit 32 (Step S2-11). For example, the ID information of the released object, a release time, a release location (coordinate) and the like are registered in the storage unit 32 in association with the terminal ID unique to the terminal device 10 and the user ID unique to the user. Accordingly, an action history and the like of the user can be managed by the management device 30. Also in the terminal device 10, the information on the release action of the user is stored in the storage unit 12 (Step S2-12). For example, the ID information of the released object, the release time, the release location (coordinate) are registered in the storage unit 12. Accordingly, for example, the object once released becomes not selectable as the release target in the next release process. For an object that has a restriction on the number of releases, a count of the release number decreases by one.

As described above, in the system of the present invention, when the object included in the image is captured or released by the terminal device 10, the display device 50 makes the object disappear or appear in the image in conjunction therewith. Accordingly, the system ensures performing the interactive presentation with reality.

In the present description, the embodiments of the present invention have been described above by referring to the drawings to express the contents of the present invention. However, the present invention is not limited to the above-described embodiments and encompasses changed forms and improved forms obvious for those skilled in the art based on the matters described in the present description.

For example, in the embodiments described in detail in the present description, to avoid occurrence of the bottleneck by concentration of access to the management device 30, the taken image is analyzed in the terminal device 10 side to identify the coordinate of the imaging range in the image. However, when the taken image is configured to be transmitted from the terminal device 10 to the management device 30, the management device 30 can analyze the taken image to identify the coordinate of the imaging range in the image. In this case, the map information for identifying the coordinate in the image only needs to be stored in the storage unit 32 of the management device 30 not the storage unit 12 of the terminal device 10.

INDUSTRIAL APPLICABILITY

The present invention is applicable to, for example, a system configured to collect images of characters and the like in a digital picture book. Accordingly, the present invention is appropriately available in an entertainment industry and the like.

DESCRIPTION OF REFERENCE SIGNS

10 Terminal device
11 Processing unit
12 Storage unit
13 Communication unit
14 Imaging unit
15 Location information acquiring unit
16 Output unit
17 Operating unit
20 Control device
30 Management device
31 Processing unit
32 Storage unit
33 Communication unit
40 Drawing device
41 Drawing unit
42 Storage unit
43 Communication unit
50 Display device
60 Screen
100 Display control system
AO Action object
IO Interaction object
F Frame

The invention claimed is:

1. A display control system comprising a portable terminal that includes a camera, a display device that displays a predetermined image including a background image and an object displayed to be superimposed on the background image, and one or more computers that control the display device, wherein
when the camera takes a part of the predetermined image displayed by the display device, the portable terminal or the one or more computers identify an imaging range in the predetermined image displayed by the display device based on an image taken by the camera by following steps of:
analyzing the image taken by the camera to extract the background image in a range of the image taken by the camera; and
comparing the extracted background image with map information for identifying a coordinate in the background image, in which the map information is preliminarily stored in the portable terminal or the one or more computers, and the one or more computers determine whether the object is included in the identified imaging range or not, and control a display state of the object on the display device based on a result of the determination, wherein the control is performed in response to the object being captured in the imaging range by the camera.

2. The display control system according to claim 1, wherein
the one or more computers control the display device to cause the object to be non-displayed when the object is included in the identified imaging range.

3. The display control system according to claim 1, wherein
the one or more computers control the display device to make the object appear in the identified imaging range.

4. The display control system according to claim 1, wherein
the portable terminal
stores the map information,
refers to the map information to identify coordinate information of the imaging range, and
transmits the coordinate information of the imaging range to the one or more computers.

5. The display control system according to claim 1, wherein
the portable terminal further identifies a current location of the portable terminal itself, and
the portable terminal or the one or more computers identify the imaging range in the predetermined image displayed by the display device based on the image taken by the camera and information on the current location identified by the portable terminal.

6. A computer program that causes a portable information communication terminal to function as the portable terminal in the display control system according to claim 1.

7. A display control method comprising:
a step of displaying a predetermined image including a background image and an object displayed to be superimposed on the background image by a display device;
a step of identifying an imaging range in the predetermined image by a portable terminal or computer system based on an image taken by a camera of the portable terminal, when the camera takes a part of the predetermined image displayed by the display device,
wherein the portable terminal or the computer system analyze the image taken by the camera to extract the background image in a range of the image taken by the camera, and
wherein the portable terminal or the computer system compare the extracted background image with map information for identifying a coordinate in the background image, in which the map information is preliminarily stored in the portable terminal or the computer system; and
a step of controlling the object by the predetermined image displayed by the display device by the computer system based on the identified imaging range,
wherein the computer system determines whether the object is included in the identified imaging range or not, and
wherein the computer system controls a display state of the object on the display device based on a result of the determination, in which the control is performed in response to the object being captured in the imaging range by the camera.

* * * * *